(12) United States Patent
Cheng et al.

(10) Patent No.: US 8,495,144 B1
(45) Date of Patent: Jul. 23, 2013

(54) TECHNIQUES FOR IDENTIFYING SPAM E-MAIL

(75) Inventors: Yun-Chian Cheng, Saratoga, CA (US); Pei-Hsun Yu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 2973 days.

(21) Appl. No.: 10/959,365

(22) Filed: Oct. 6, 2004

(51) Int. Cl.
*G06F 15/16* (2006.01)

(52) U.S. Cl.
USPC .......................................... 709/206; 709/203

(58) Field of Classification Search
USPC .................................................. 709/203, 206
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,640,492 A * | 6/1997 | Cortes et al. | 706/20 |
| 5,649,068 A * | 7/1997 | Boser et al. | 706/12 |
| 5,907,834 A | 5/1999 | Kephart et al. | |
| 5,999,932 A * | 12/1999 | Paul | 707/10 |
| 6,161,130 A * | 12/2000 | Horvitz et al. | 709/206 |
| 6,192,512 B1 | 2/2001 | Chess | |
| 6,279,128 B1 * | 8/2001 | Arnold et al. | 714/49 |
| 6,622,134 B1 * | 9/2003 | Sorkin | 706/20 |
| 6,650,890 B1 | 11/2003 | Irlam et al. | |
| 6,711,583 B2 * | 3/2004 | Chess et al. | 1/1 |
| 6,732,157 B1 | 5/2004 | Gordon et al. | |
| 6,789,200 B1 | 9/2004 | Fiveash et al. | |
| 6,813,712 B1 | 11/2004 | Luke | |
| 7,287,060 B1 * | 10/2007 | McCown et al. | 709/206 |
| 2003/0235934 A1 * | 12/2003 | Manfra et al. | 438/46 |
| 2004/0006747 A1 * | 1/2004 | Tyler | 715/530 |
| 2004/0073617 A1 * | 4/2004 | Milliken et al. | 709/206 |
| 2004/0128355 A1 * | 7/2004 | Chao et al. | 709/206 |
| 2005/0015452 A1 * | 1/2005 | Corson | 709/206 |
| 2005/0015626 A1 * | 1/2005 | Chasin | 713/201 |
| 2005/0076241 A1 * | 4/2005 | Appelman | 713/201 |
| 2005/0108340 A1 * | 5/2005 | Gleeson et al. | 709/206 |
| 2005/0120019 A1 * | 6/2005 | Rigoutsos et al. | 707/6 |
| 2005/0144241 A1 * | 6/2005 | Stata et al. | 709/206 |
| 2005/0210116 A1 * | 9/2005 | Samson | 709/207 |
| 2005/0240617 A1 * | 10/2005 | Lund et al. | 707/102 |

(Continued)

FOREIGN PATENT DOCUMENTS

| | | |
|---|---|---|
| EP | 1 377 892 B1 | 9/2004 |
| WO | WO 02/084459 A1 | 10/2002 |

OTHER PUBLICATIONS

Spam Assassin 2.64, Aug. 2004, 4 sheets. Webpage [online] [retrieved on Sep. 7, 2004]. Retrieved from the internet:: <URL:http://www.spamassasin.apache.org.html>.

(Continued)

*Primary Examiner* — B. Tiv
(74) *Attorney, Agent, or Firm* — Okamoto & Benedicto LLP (57) ABSTRACT

In one embodiment, a support vector machine is employed to compute a spam threshold and weights of tokens and heuristic rules. An incoming e-mail is parsed to determine if it contains one or more of the tokens. Tokens identified to be in the e-mail are then used to determine if the e-mail satisfies one or more heuristic rules. The weights of tokens found in the e-mail and the weights of the heuristic rules satisfied by the e-mail may be employed in the computation of a spam score. The spam score may be compared to the spam threshold to determine if the e-mail is spam or legitimate.

20 Claims, 5 Drawing Sheets

U.S. PATENT DOCUMENTS

| | | | | |
|---|---|---|---|---|
| 2005/0289148 | A1* | 12/2005 | Dorner et al. | 707/10 |
| 2006/0031306 | A1* | 2/2006 | Haverkos | 709/206 |
| 2006/0031318 | A1* | 2/2006 | Gellens | 709/206 |
| 2006/0031373 | A1* | 2/2006 | Werner et al. | 709/207 |
| 2006/0168006 | A1* | 7/2006 | Shannon et al. | 709/206 |
| 2006/0282888 | A1* | 12/2006 | Bandini et al. | 726/14 |

OTHER PUBLICATIONS

The Formulation of Support Vector Machine, 1998, 2 sheets [retrieved on Jul. 21, 2004]. Retrieved from the internet: <URL:http://www.mi-eng.cam.ac.uk/kkc21/main/node8.html>.

New Advance Anti-Spam Service, "Aladdin Knowledge Systems Launches New Advanced Anti-Spam Service" Jun. 26, 2003, 3 sheets. Webpage [online] [retrieved on Jul. 21, 2004]. Retrieved from the internet: <URL:http://www.ealladin.com/new/2003/esafe/anti-spam.asp.html>.

SVM-Light Support Vector Machine 6.01, Feb. 2004, 14 sheets. Webpage [online][retrieved on Sep. 9, 2004]. Retrived from the internet: <URL:http://www.cs.cornell.edu/People/tj/svm_light/html>.

Steve Ramsay's Guide to Regular Expressions, Electronic Text Center, University of Virginia, 12 sheets [retrieved on Sep. 2, 2004]. Retreived from the internet: <URL:http://www.etext.lib.virginia.edu/helpsheets/regex.html>.

* cited by examiner

TECHNIQUES FOR IDENTIFYING SPAM E-MAIL

BACKGROUND OF THE INVENTION

1. Field of the Invention

The present invention relates generally to electronic mail ("e-mail"), and more particularly but not exclusively to identification of spam e-mails.

2. Description of the Background Art

E-mail provides a convenient, fast, and relatively cost-effective way of sending messages to a large number of recipients. It is thus no wonder that solicitors, such as advertisers, use e-mail to indiscriminately send messages to e-mail accounts accessible over the Internet. These unsolicited e-mails, also referred to as "junk mail" or "spam", are not only a nuisance, but also translate to lost time and money as employees or home users are forced to segregate them from legitimate e-mails.

Techniques for combating spam have been developed and made available to the general public. Most of these anti-spam techniques involve detection of texts typically employed by spammers. Because some texts are more indicative of spam than others, each text is assigned a weight. Some anti-spam engines assign weights using a so-called "genetic algorithm." In operation, an incoming e-mail is checked for the presence of these texts. The weights of found texts are then added up to generate a spam score. If the spam score is higher than a certain spam threshold, the e-mail is deemed a spam. Otherwise, the e-mail is deemed legitimate.

One problem with existing anti-spam techniques is that the use of genetic algorithm to assign weights to texts involves relatively long computational time and may not provide good results against unsolicited e-mails that vary considerably from those used to compute the weights. Another problem with existing anti-spam techniques is that use of text matching alone to identify spam may be insufficient to detect whether an e-mail is spam or legitimate.

SUMMARY

In one embodiment, a support vector machine is employed to compute a spam threshold and weights of tokens and heuristic rules. An incoming e-mail is parsed to determine if it contains one or more of the tokens. Tokens identified to be in the e-mail are then used to determine if the e-mail satisfies one or more heuristic rules. The weights of tokens found in the e-mail and the weights of the heuristic rules satisfied by the e-mail may be employed in the computation of a spam score. The spam score may be compared to the spam threshold to determine if the e-mail is spam or legitimate.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
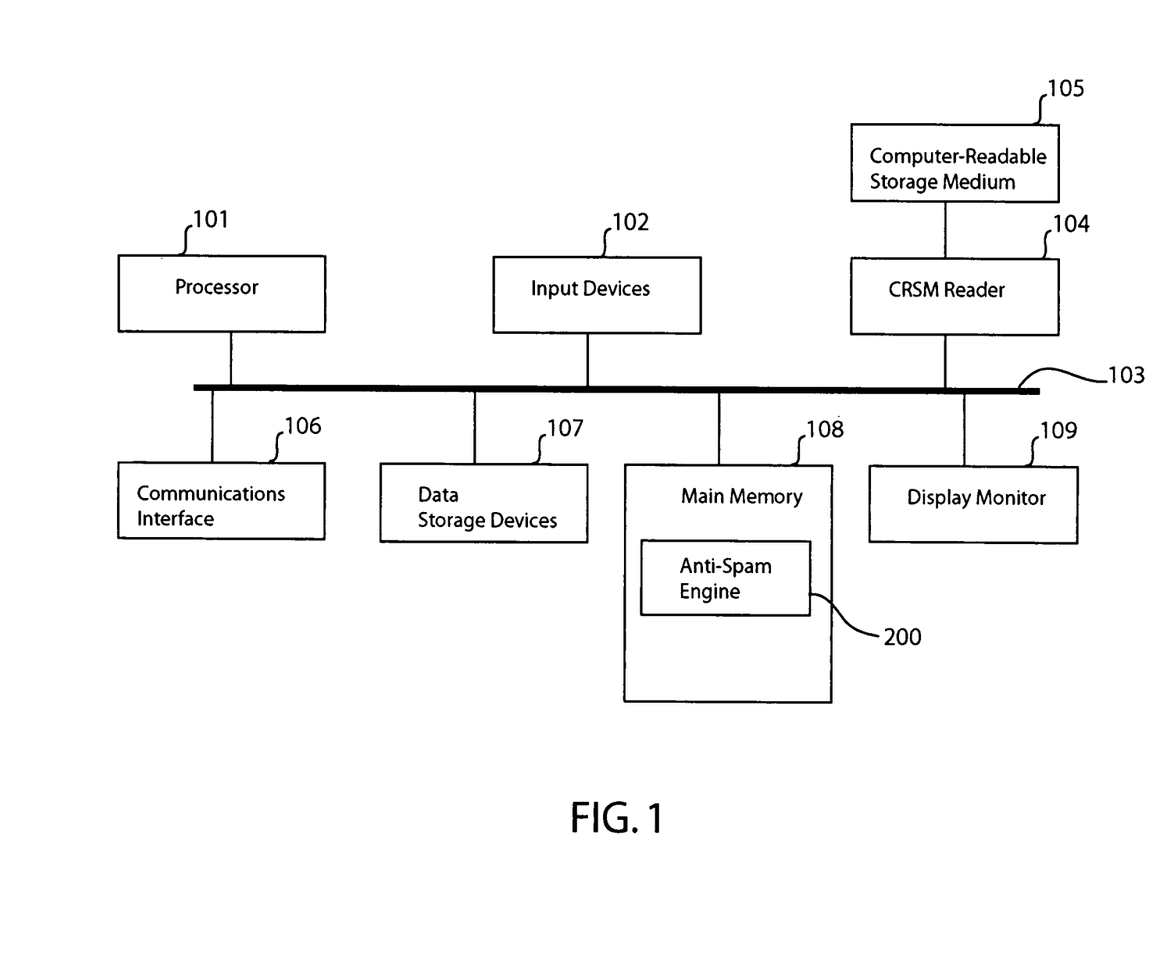
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a desktop computer, a server computer, or an appliance, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes an anti-spam engine 200 (see FIG. 2). Anti-spam engine 200 may be executed by processor 101.

Figure 2:
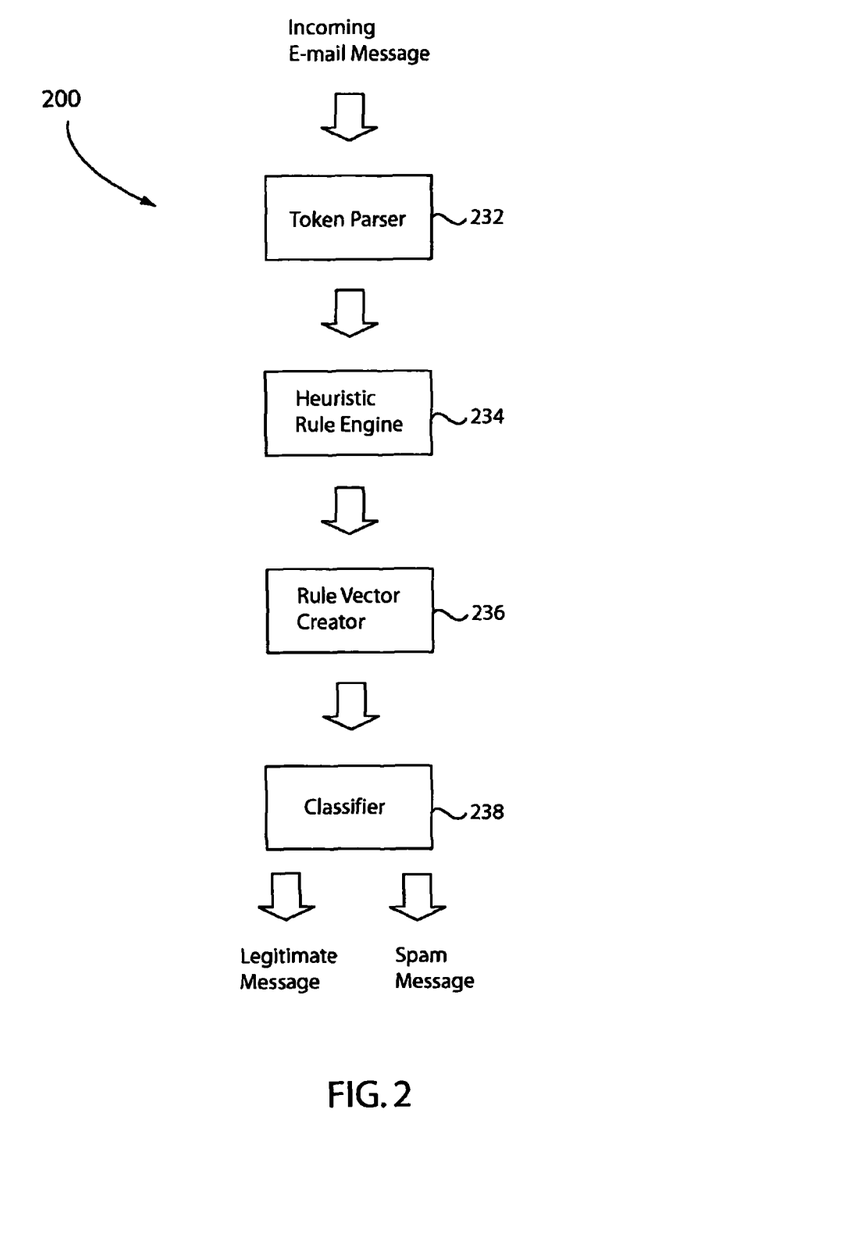
FIG. 2 shows a flow diagram of an anti-spam engine in accordance with an embodiment of the present invention.
Figure 3:
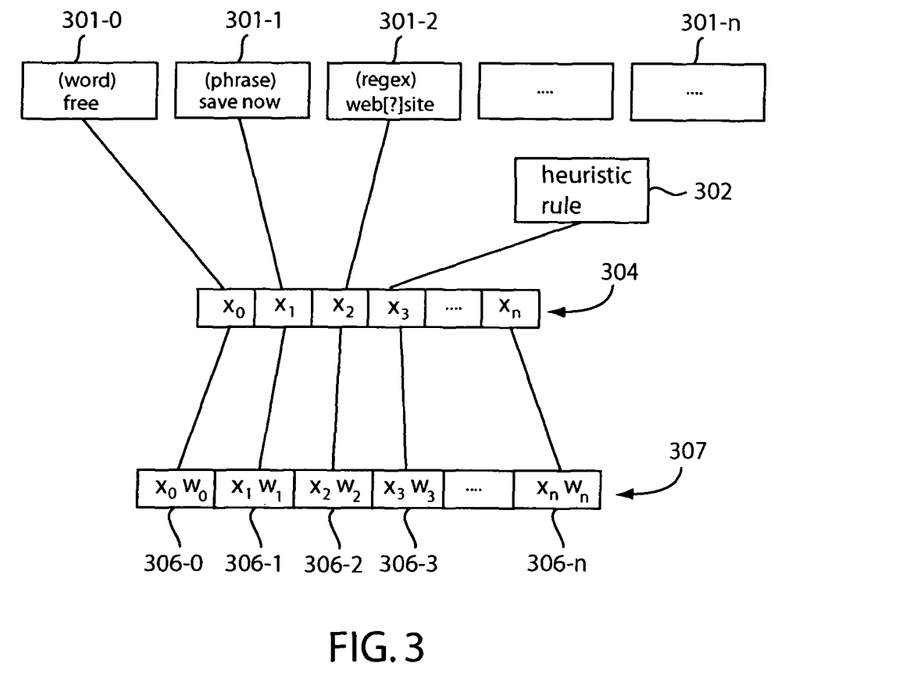
FIG. 3 schematically shows example operations in the flow diagram of FIG. 2.

FIG. 2 shows a flow diagram of an anti-spam engine 200 in accordance with an embodiment of the present invention, while FIG. 3 schematically shows example operations in the flow diagram of FIG. 2. As shown in FIG. 2, an anti-spam engine 200 may include a token parser 232, a heuristic rule engine 234, a rule vector creator 236, and a classifier 238.

Token parser 232 may comprise computer-readable program code for parsing the contents of an e-mail message. An e-mail message may include a body portion and a header portion. The body portion may contain information (e.g., in text, HTML) readable by a user. The header portion of an e-mail may include a sender field (i.e., "from"), an addressee field (i.e., "to"), and a subject field (i.e., "re"). Token parser 232 may receive an incoming e-mail, and parse the e-mail for particular tokens. In one embodiment, a token may be a word, a phrase, a single character, an HTML tag, or a regular expression (also referred to as "regex") indicative of spam. A regular expression may comprise a pattern for matching various text strings. For example, a symbol "[?]" may be used in a regular expression as a place holder for a single character, a symbol "[*]" may be used in a regular expression as a placeholder for any number of characters, and so on.

In the example of FIG. 3, token parser 232 looks for tokens 301 (i.e., 301-0, 301-1, 301-2, . . . 301-$n$) in an incoming e-mail. As a particular example, token parser 232 may look for the presence of the word "free" (see token 301-0) or the phrase "save now" (see token 301-1) in the body or header portion of an e-mail. Token parser 232 may also parse an e-mail for words or phrases matching a regular expression. As a particular example, token parser 232 may look for words or phrases satisfying the regular expression "web[?]site" (see token 301-2), which matches the words "web-site", "web site", "web_site", and so on. In light of the present disclosure, those of ordinary skill in the art will appreciate that other regular expressions may also be used as tokens.

Referring back to FIG. 2, tokens identified by token parser 232 as being present in the incoming e-mail message may be forwarded to heuristic rule engine 234. Heuristic rule engine 234 may comprise computer-readable program code for determining if tokens parsed from the incoming e-mail satisfy pre-determined heuristic rules. A heuristic rule may describe relationships between tokens. In one embodiment, heuristic rule engine 234 employs expert system type condition-action rules to describe relationships between tokens. That is, heuristic rule engine 234 may determine if a heuristic rule is satisfied (i.e., fired) based on the presence or absence of certain tokens in an incoming e-mail, and specify one or more actions to take if the heuristic rule is satisfied. Information about expert system condition-action sty rules can also be found in, for example, Buchanan, B., and Shortliffe, E., Eds. "Rule-Based Expert Systems: The MYCIN Experiments of the Stanford Heuristic Programming Project," Addison-Wesley, Reading, Mass., 1984.

Generally speaking, a heuristic rule may describe characteristics of a spam e-mail in terms of relationships between tokens. A heuristic rule may describe the proximity of words, such as whether two words are adjacent or at most separated by one or two words. A heuristic rule may count the number of single character tokens in one line to catch spammer tricks for evading pattern matching, such as by inserting a space between characters (e.g., "D I S C O U N T" instead of "DISCOUNT"). A heuristic rule may look for the presence of particular HTML tags or combination of HTML tags and texts. Other heuristic rules describing relationships between tokens in the same or different portions of an e-mail may also be used without detracting from the merits of the present invention. In light of the present disclosure, those of ordinary skill in the art will appreciate that heuristic rules are superior to mere pattern/text matching techniques because heuristic rules are more flexible and allow for a more complete description of a spam message. For example, a heuristic rule may be defined to look for the presence of certain tokens in both the header portion (e.g., the word "SAVE" in a subject field) and the body portion (e.g., "TODAY") of the same e-mail to more accurately detect spam. Preferably, an anti-spam engine would employ both pattern/text matching and heuristic rules.

Data identifying the tokens detected by token parser 232 and heuristic rules determined by heuristic rule engine 234 as being satisfied may be provided to rule vector creator 236. Rule vector creator 236 may comprise computer-readable program code for creating a matched rule vector for each incoming e-mail. A matched rule vector may include vector components indicating whether or not a token is found in or a heuristic rule is satisfied by an incoming e-mail. Referring to FIG. 3, there is shown an example matched rule vector 304 having components $x_0, x_1, x_2, \ldots x_n$, in accordance with an embodiment of the present invention. In the example of FIG. 3, component $x_0$ indicates whether the e-mail has token 301-0, component $x_1$ indicates whether the e-mail has token 301-1, component $x_2$ indicates whether the e-mail has token 301-2, component $x_3$ indicates whether the e-mail satisfies a heuristic rule 302, and so on. In one embodiment, a component x is a number "0" to indicate the absence of a token or that a heuristic rule is not satisfied, and a number "1" to indicate the presence of a token or that a heuristic rule is satisfied.

Classifier 238 may comprise computer-readable program code for computing a spam score of an incoming e-mail message. Classifier 238 may compare the spam score to a threshold b to determine whether the incoming e-mail is legitimate or spam. For example, classifier 238 may deem an incoming e-mail as spam if its spam score is greater than or equal to the threshold b, and legitimate if its spam score is less than the threshold. Classifier 238 may compute a spam score based on a presence of a token or a heuristic rule being satisfied. Each token or heuristic rule may be assigned a weight w (i.e., $w_0, w_1, w_2, \ldots w_n$) that may be added to come up with the spam score. As will be more apparent below, each weight w may be computed using a support vector machine.

In one embodiment, classifier 238 computes a spam score based on a matched rule vector 304 received from rule vector creator 236. Referring to FIG. 3, classifier 238 may generate a summation list 307 for each incoming e-mail. A summation list 307 may include components 306 (i.e., 306-0, 306-1, . . . ,306-$n$). In one embodiment, each component 306 has a value obtained by multiplying a component of a matched rule vector 304 with the corresponding weight of that component (i.e., the weight assigned to the token or heuristic rule represented by that component of the matched rule vector). In the example of FIG. 3, the value of component 306-0 is obtained by multiplying component $x_0$ of a matched rule vector 304 with a corresponding weight $w_0$ for component $x_0$, the value of component 306-1 is obtained by multiplying component $x_1$ of a matched rule vector 304 with a corresponding weight $w_1$ for component $x_1$, and so on. Using FIG. 3 as an example and assuming the word "FREE" has a weight "0.003" and is present in the e-mail but the phrase "SAVE NOW" having a weight of "0.01" is not, a matched rule vector 304 would have the value "1 0 . . . " and the summation list 307 would have "(1)×(0.003), (0)× (0.01), . . . ." Classifier 238 may add up all components 306 (e.g., (1)×(0.003)+(0)×(0.01)+ . . . ) to generate a spam score.

Figure 4:
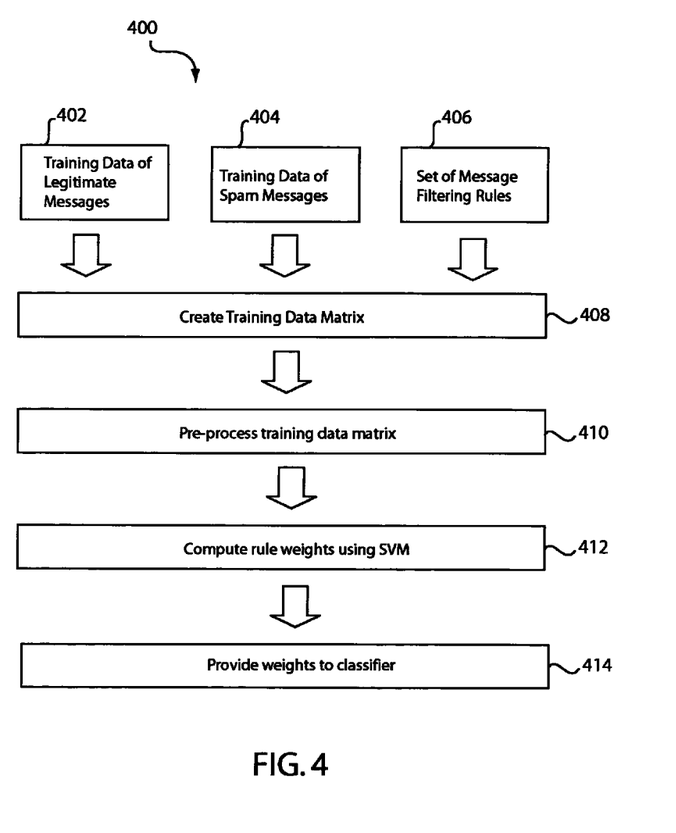
FIG. 4 shows a flow diagram of a method of computing e-mail message filtering rule weights in accordance with an embodiment of the present invention.

Referring now to FIG. 4, there is shown a flow diagram of a method 400 of computing e-mail message filtering rule weights in accordance with an embodiment of the present invention. In steps 402, 404, and 406, training data of legitimate messages, training data of spam messages, and a set of message filtering rules, respectively, are provided as inputs to the step of creating a training data matrix (see step 408). In one embodiment, the training data of legitimate messages comprise e-mail messages that have been verified as legitimate messages (i.e., certified as non-spam), while the training data of spam messages comprise e-mail messages that have been verified as spam. In one embodiment, the set of message filtering rules comprise tokens and heuristic rules. As will be more apparent below, the training data of legitimate messages, the training data of spam messages, and the set of message filtering rules may be used to train a support vector machine.

Figure 5:
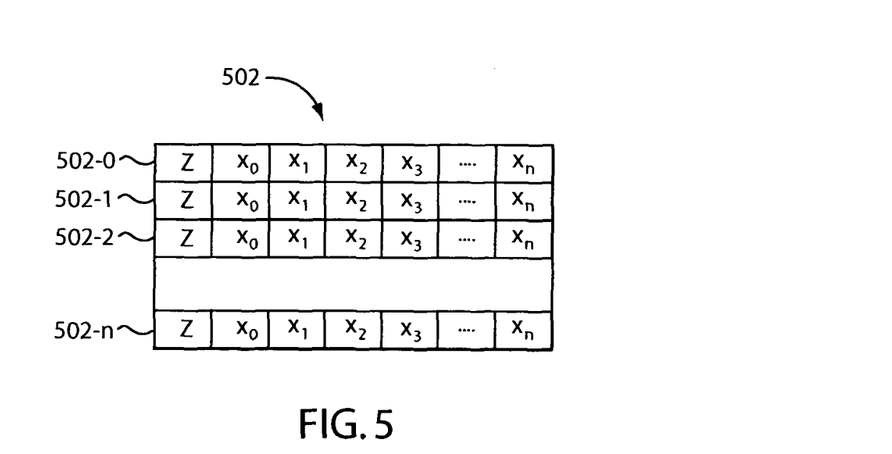
FIG. 5 schematically illustrates a training data matrix in accordance with an embodiment of the present invention.

In step 408, a training data matrix is created using the training data of legitimate messages, the training data of spam messages, and the set of message filtering rules. FIG. 5 schematically illustrates a training data matrix 502 in accordance with an embodiment of the present invention. Training data matrix 502 may include rows 502 (i.e., 502-0, 502-1, . . . ,502-n). Each row 502 represents an e-mail from the training data of legitimate messages or training data of spam messages. In one embodiment, each row 502 is a vector having vector components $z, x_0, x_1, x_2, \ldots x_n$. A component z indicates whether the e-mail is from the training data of legitimate messages or from the training data of spam messages. For example, a "−1" in a component z may indicate that the e-mail is from the training data of legitimate messages (i.e., the e-mail has been verified as non-spam), while a "+1" in a component z may indicate that the e-mail is from the training data of spam messages (i.e., the e-mail has been verified as spam). As in matched rule vector 304, components $x_0, x_1, x_2, \ldots x_n$ of a row 502 indicate whether or not a token is present in or a heuristic rule is satisfied by the e-mail. Using FIG. 3 as an example, assuming a spam e-mail from the training data has the word "FREE", does not have the phrase "SAVE NOW", and satisfies the regular expression "web[?]site" (e.g., the spam e-mail has the word "web-site"), the row 502 for that spam e-mail would be "1101 . . . ."

In step 410, the training data matrix is pre-processed prior to being input to a support vector machine. The pre-processing step may process the training data matrix into a form that minimizes support vector machine computation time. In one embodiment, step 410 involves removing duplicate rows from the training data matrix.

In step 412, the weights for the message filtering rules (i.e. the weights for the tokens and heuristic rules) are computed using a support vector machine. In one embodiment, step 412 is performed by inputting the training data matrix into a support vector machine. It is to be noted that support vector machines, in general, are well known. For example, see Cristianini, N., Shawe-Taylor, J., "An Introduction to Support Vector Machines," Cambridge University Press (2000). In one embodiment, a support vector machine is employed to create a maximum-margin hyperplane that lies in a transformed input space. Given e-mail training data labeled as either spam (e.g., component z=1) or non-spam (i.e., legitimate; e.g., component z=0), a maximum-margin hyperplane splits the spam and non-spam e-mail training data, such that the distance from the closest examples (the margin) to the hyperplane is maximized. If there exists no hyperplane that can split the spam and non-spam examples, the support vector machine will choose a hyperplane that splits the examples as cleanly as possible, while still maximizing the distance to the nearest cleanly split examples. Each column along components $x_0, x_1, x_2, \ldots x_n$ of the training data matrix may be represented in the support vector machine as a "feature," which may be a word, a phrase, a regular, expression, a heuristic rule (including expert system type rules), and so on.

Using the training data matrix as input, the support vector machine outputs a threshold b and weights $w_0, w_1, w_2, \ldots w_n$ for components $x_0, x_1, x_2, \ldots x_n$, respectively. In step 414, threshold b and weights $w_0, w_1, w_2 \ldots w_n$ are provided to classifier 238 (see FIG. 2). As previously discussed with reference to FIG. 2, threshold b and weights $w_0, w_1, w_2, \ldots w_n$ may be employed by classifier 238 to determine whether an incoming e-mail is spam or legitimate. The threshold b and weights $w_0, w_1, w_2, \ldots w_n$ advantageously allow for a more accurate determination of whether an e-mail is spam or legitimate because the maximum-margin hyperplane created by the support vector machine maximizes the distance between spam and legitimate examples during training. Note that method 400 may be performed from time to time with updated training data to generate more accurate thresholds and weights.

Figure 6:
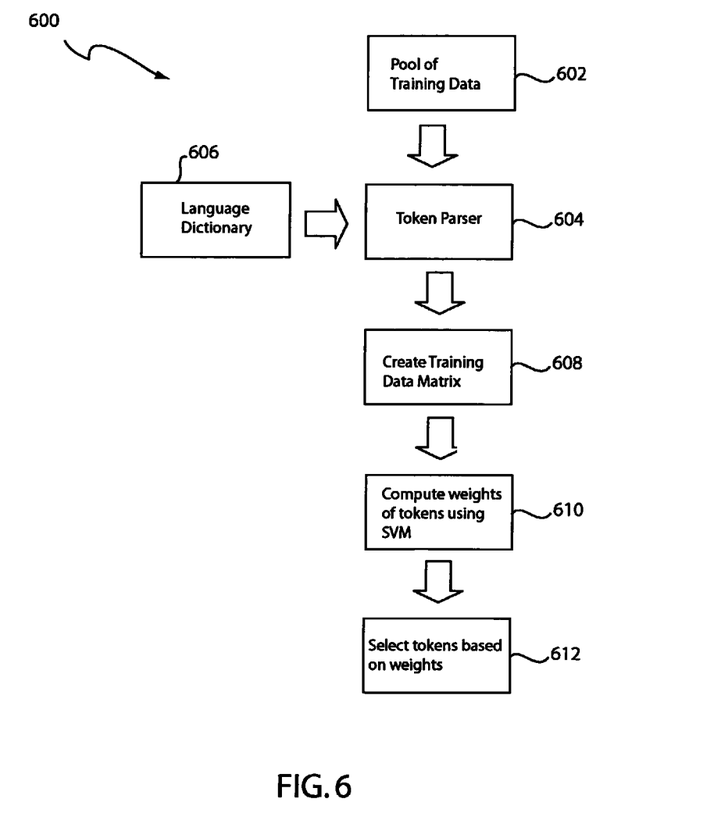
FIG. 6 shows a flow diagram of a method of selecting tokens in accordance with an embodiment of the present invention.

Referring now to FIG. 6, there is shown a flow diagram of a method 600 of selecting tokens in accordance with an embodiment of the present invention. In one embodiment, method 600 is employed to select a good set of words or phrases for classifying an e-mail for a particular language. As shown in FIG. 6, a pool of training data (602) may be provided to a token parser (604). The pool of training data may include training data of legitimate e-mail messages and training data of spam e-mail messages (training data were also previously discussed with reference to FIG. 4). The token parser may comprise computer-readable program code for parsing an e-mail for tokens. The tokens, which in this example are words and phrases of interest for a particular language, may be stored in a language dictionary (606). The use of a language dictionary is particularly useful for some languages, such as Mandarin Chinese, where no obvious character separator is used. The token parser consults the language dictionary to determine if a word or phrase of interest is present in the e-mail. If a word or phrase from the language dictionary is present in at least any one e-mail in the pool of training data, that word or phrase is recorded and kept as a component x of a row of a training data matrix (608; a training data matrix was also previously discussed with reference to FIG. 5). The training data matrix is then input to a support vector machine (610), which generates a threshold b and weights $w_0, w_1, w_2, \ldots w_n$ for components $x_0, x_1, x_2, \ldots x_n$, respectively, of the training data matrix. The top N components $x_0, x_1, x_2, \ldots x_n$ (i.e., words or phrases), sorted by the magnitude of their weights, are then selected for use as tokens or part of a heuristic rule for an anti-spam engine (612). For example, N may be between 1000 and 5000 depending on the language.

As can be appreciated, a support vector machine may be used twice in some embodiments of the invention. In a first use, a support vector machine may be used to select words and phrases from a language dictionary as discussed above with reference to FIG. 6. Relationships between selected words and phrases and other tokens may be described using heuristic rules. In a second use, a support vector machine may be used to compute weights for the heuristic rules and tokens, which may include the selected words and phrases from the language dictionary.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying spam e-mail, the method to be performed by a computer having a processor and memory, the memory comprising computer-readable program code configured to be executed by the processor so the computer can perform the method, the method comprising:
   the computer identifying one or more of the tokens in an e-mail, wherein the tokens are selected for use in identifying spam e-mail, and wherein weights of the tokens, weights of heuristic rules that describe relationships between the tokens, and a threshold are computed using a support vector machine;

the computer using identified tokens to determine if the e-mail satisfies one or more of the heuristic rules;

the computer using weights of the identified tokens and a weight of a satisfied heuristic rule to generate a spam score; and the computer comparing the spam score to the threshold to determine if the e-mail is a spam e-mail or a legitimate e-mail.

2. The method of claim 1 wherein the tokens comprise words and phrases.

3. The method of claim 1 wherein the tokens comprise heuristic rules.

4. The method of claim 1 wherein the identified tokens are from a body portion and a header portion of the e-mail.

5. The method of claim 1 wherein the tokens comprise words and phrases for a particular language and are selected using a support vector machine.

6. The method of claim 1 wherein the tokens are selected for use in identifying spam e-mail using a method comprising:

storing a plurality of words and phrases in a language dictionary;

consulting the language dictionary to find a word or a phrase present in at least one e-mail training data;

computing weights for each found word and phrase using a support vector machine; and selecting found words and phrases for identifying spam based on their computed weights.

7. The method of claim 1 wherein comparing the spam score to the threshold comprises:

the computer determining if the spam score is greater than the threshold; and the computer deeming the e-mail as spam if the spam score is greater than the threshold.

8. The method of claim 1 wherein the heuristic rule counts a number of single character tokens in the e-mail.

9. The method of claim 1 wherein the heuristic rule describes relationships between tokens found in different portions of the e-mail.

10. A computer comprising computer-readable storage medium and a processor, the processor being configured to execute computer-readable program code in the computer-readable storage medium, the computer readable storage medium comprising:

a token parser comprising computer-readable program code configured for execution by the processor to identify tokens present in an incoming e-mail;

a heuristic rule engine comprising computer-readable program code configured for execution by the processor to determine if the tokens identified by the token parser satisfy a heuristic rule; and a classifier comprising computer-readable program code configured for execution by the processor to determine whether or not the e-mail is spam based on weights assigned to identified tokens and a weight of a satisfied heuristic rule, the weights of the tokens and the weight of the satisfied heuristic rule being computed using a support vector machine.

11. The computer of claim 10 wherein the computer-readable storage medium further comprises:

a rule vector creator comprising computer-readable program code configured for execution by the processor to generate a matched rule vector having a plurality of components, a component of the matched rule vector being indicative of a presence or absence of a token or a heuristic rule in the e-mail, the matched rule vector being formatted for input to the classifier.

12. The computer of claim 10 wherein the tokens comprise words and phrases.

13. The computer of claim 10 wherein the tokens comprise regular expressions.

14. The computer of claim 10 wherein the identified tokens are present in a header portion and a body portion of the e-mail.

15. A method of identifying spam e-mail, the method to be performed by a computer having a processor and memory, the memory comprising computer-readable program code configured to be executed by the processor so the computer can perform the method, the method comprising:

the computer selecting tokens among a plurality of tokens for use in identifying spam e-mail;

the computer creating heuristic rules describing relationships between the selected tokens;

the computer creating a training data matrix having a plurality of rows, each of the rows having components that correspond to a selected token or a heuristic rule;

the computer inputting the training data matrix to a support vector machine to compute weights of the selected tokens and weights of the heuristic rules, wherein the weights of selected tokens and the weights of the heuristic rules are employed to identify spam e-mails.

16. The method of claim 15 wherein the tokens comprise words and phrases.

17. The method of claim 15 wherein the tokens comprise regular expressions.

18. The method of claim 15 further comprising:

the computer computing a spam threshold using the support vector machine.

19. The method of claim 15 wherein selecting tokens among the plurality of tokens comprises:

storing a plurality of words in a language dictionary;

consulting the language dictionary to find a word present in at least one e-mail training data;

computing weights for each found word using a support vector machine; and selecting found words for identifying spam based on their computed weights.

20. The method of claim 15 wherein the weights of the selected tokens and the weights of the heuristic rules are used to identify spam e-mails in a method comprising:

identifying a presence of selected tokens in the incoming e-mail;

determining if the identified selected tokens satisfy a heuristic rule;

adding at least the weights of the identified selected tokens and a weight of the satisfied heuristic rule to generate a spam score; and comparing the spam score to a spam threshold.

* * * * *